Feb. 14, 1939.                H. KLEIN                 2,146,746
           STARTING APPARATUS FOR INTERNAL COMBUSTION ENGINES
                        Filed May 19, 1936
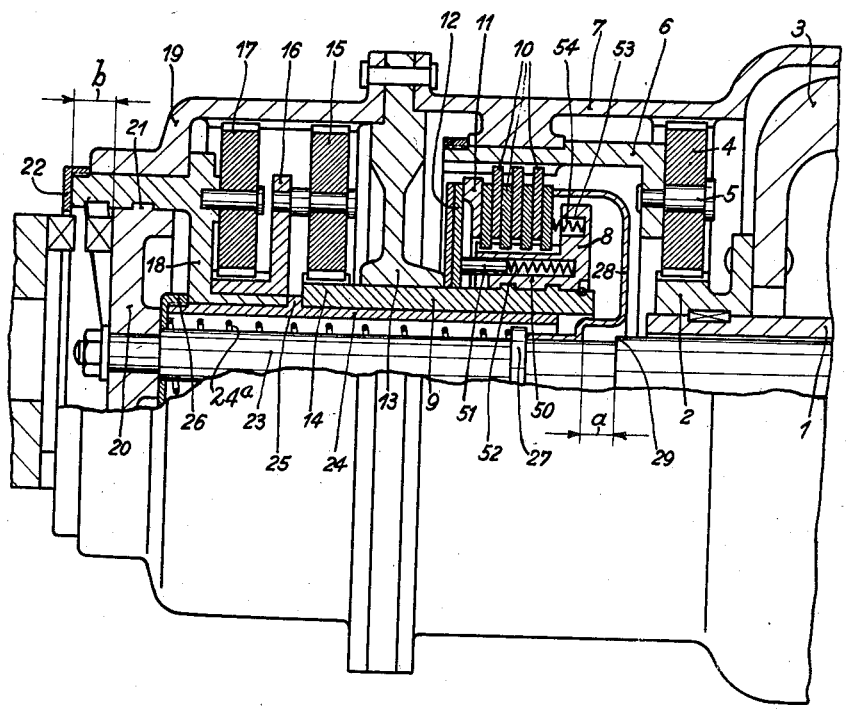
Inventor
Hermann Klein
by Stursed + McKay
his attorneys Patented Feb. 14, 1939

2,146,746

UNITED STATES PATENT OFFICE 2,146,746

STARTING APPARATUS FOR INTERNAL COMBUSTION ENGINES

Hermann Klein, Stuttgart-Feuerbach, Germany, assignor to Robert Bosch Gesellschaft mit beschränkter Haftung, Stuttgart, Germany Application May 19, 1936, Serial No. 80,595 In Germany May 23, 1935

8 Claims. (Cl. 123—179)

The invention relates to a starting apparatus for internal combustion engines, and more especially one having a flywheel, in which a driving member that can be engaged at will in a part of the engine to be started, is connected to the driving member of the apparatus by means of an automatically acting friction disc clutch, which only becomes operative after the engagement of the driving member by an axially screwing pressure member, because the friction discs in the position of rest are held free from the pressure of the pressure member. If it is desired to insert a transmission gear in such apparatus between the friction clutch and the driving member in order to keep the clutch of small size, it is difficult to effect the operation in dependence upon the motion of the driving member.

An advantageous and simple solution of the problem consists, according to the invention, in that a rod which serves for the engagement of the driving member is used to operate the clutch, which rod passes through the clutch and the transmission gear.

In the drawing a starter of the flywheel type is shown in section.

In the drawing, 1 denotes a hollow driving shaft, which can be driven for example by an electric motor. On the shaft 1 is keyed a toothed wheel 2, which is provided with a flange on which a flywheel 3 is fastened. A planet wheel 4 is in engagement with this toothed wheel, and is rotatably mounted on a pin 5 which is arranged in a cup 6, which in turn is rotatably mounted in the casing 7 of the starting apparatus.

The cup 6 forms the driving part of a friction disc clutch whilst a nut 8 forms the driven part, which nut is screwably arranged on a sleeve 9 positioned in the part 13 of the casing. The nut has several long bores or holes 50 in which bolts 51 and spring 52 are arranged, which are adapted to reduce the pressure of the nut on the friction discs. Moreover, the nut has in its flanged portions several holes 53 in which are positioned weak springs 54, which hold the friction discs in the position of rest under light pressure. Between the cup and the nut are arranged a number of friction discs 10. A pressure plate 11 and spring discs 12 serve as an abutment for the friction discs, which discs can bear against the bearing 13 of the sleeve 9. The end of the sleeve 9 projecting beyond the bearing 13 is formed as a toothed gear wheel 14, which drives a cup 18 through a two-stage planet-wheel gear 15, 16, 17, which cup 18 is mounted in the casing part 19. In the cup 18 is arranged a clutch member 20 which is connected to the cup through a quick pitch thread 21. At the outer end of the cup is a stop 22 which limits the movement of the clutch on engagement with the counter clutch member on the crank-shaft of an engine.

The clutch member is fastened to a rod 23, which passes through the planet wheels, the friction clutch, and the hollow shaft 1 and can be displaced by a device (not shown) such as a lever, electromagnet or the like. In the screwed sleeve 9 and the cup 18 is a bearing and supporting sleeve 24 which is secured against longitudinal movement by a collar 25, which engages between the sleeve 9 and the boss of the cup 18.

On the end of the sleeve 24 is screwed a capnut 26. Between the latter and a flange or collar 27 on the rod 23 is situated a compression spring 24a, which tends to disengage the clutch by keeping apart the friction discs. On the rod between the collar and the shaft 1 a cup 28 is slidably mounted, the outer edge of which surrounds the nut 8 and bears against the friction discs. The rod 23, looked at from the clutch 20, has a shoulder 29 behind the cup 28, which in the position of rest of the clutch is distant from the cup by the amount $a$. The distance $a$ is somewhat shorter than the engagement path $b$ of the clutch to the stop 22.

To start the engine the flywheel 3 is first brought to a high speed. Thereby the friction clutch is rotated along with it, and conveys to the planet gear and the clutch only a small torque since the clutch discs are only under the pressure of the weak springs 54. An automatic screwing of the clutch on the quick thread is prevented by the spring 24a. After the flywheel has attained a high speed, the driver moves the rod 23 and the clutch member 20 forward. As soon as the clutch member engages the opposing clutch member, the engagement motion is assisted by the quick pitch thread 21. When the clutch and the rod have travelled the distance $a$, the flange 29 strikes against the cup 28 and presses it against the friction discs. By the increased pressure on the discs the torque transmitted by the clutch increases to such an extent that the clutch nut on screwing forward overcomes the pressure of the distance springs 52, and presses the friction discs together with great force, i. e., makes the coupling fully operative. On overtaking, the clutch member 20 is screwed back on the quick thread.

I declare that what I claim is:

1. Starting mechanism for internal combustion engines comprising a driving member engageable with a part of the engine to be started, a driving shaft, an automatic friction disc clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction disc clutch fully operative after engagement of the driving member with the part of the engine to be started, transmission gear means between said rotatable means and said driving member, a rod displaceable at will for bringing said driving member into engagement with the part of the engine to be started and means carried by said rod for operating said friction clutch, which rod passes through said transmission gear means and said clutch.

2. Starting mechanism for internal combustion engines comprising a driving member engageable with a part of the engine to be started, a driving shaft, an automatic friction disc clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction disc clutch fully operative after engagement of the driving member with the part of the engine to be started, transmission gear means between said rotatable means and said driving member, a rod displaceable at will to bring said driving member into engagement with the part of the engine to be started and stop means on said rod which after a predetermined length of travel with said rod, exerts a pressure on said friction clutch to render said friction clutch fully operative.

3. Starting mechanism for internal combustion engines comprising a driving member engageable with a part of the engine to be started, a driving shaft, an automatic friction disc clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction disc clutch fully operative after engagement of the driving member with the part of the engine to be started, transmission gear means between said rotatable means and said driving member, a rod displaceable at will to bring said driving member into engagement with the part of the engine to be started, a shoulder on said rod, a cup member disposed in the path of said shoulder which cup member on displacement of said rod to engage said driving member with said engine part causes said cup member to abut against said friction disc clutch and render the latter fully operative.

4. Starting mechanism for internal combustion engines comprising a driving member engageable with a part of the engine to be started, a driving shaft, an automatic friction disc clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction disc clutch fully operative after engagement of the driving member with the part of the engine to be started, transmission gear means between said rotatable means and said driving member, a rod displaceable at will for bringing said driving member into engagement with the part of the engine to be started and means carried by said rod for operating said friction clutch, which rod passes through said transmission gear means and said clutch, said transmission gear means and said clutch being arranged coaxially of and symmetrically about said rod.

5. Starting mechanism for internal combustion engines comprising a driving member engageable with a part of the engine to be started, a driving shaft, an automatic friction clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction clutch fully operative only after engagement of the driving member with the engine to be started, transmission on gear means between said rotatable means and said driving member, a manually operable member displaceable at will for bringing said driving member into engagement with the part of the engine to be started, and means carried by said manually operable member for operating said friction clutch.

6. Starting mechanism for internal combustion engines comprising a driving member engageable with a part of the engine to be started, a driving shaft, an automatic friction clutch connected to said driving shaft, an axially screwing pressure member, rotatable means mounting said pressure member for longitudinal movement thereon and rotary movement therewith, said pressure member connecting said friction disc clutch and said rotatable means and being displaceable to render said friction clutch fully operative only after engagement of the driving member with the engine to be started, transmission gear means between said rotatable means and said driving member, a manually operable member displaceable at will for bringing said driving member into engagement with the part of the engine to be started, and means carried by said manually operable member for operating said friction clutch, said clutch being arranged coaxially of and symmetrically about said manually operable member.

7. Starting mechanism for internal combustion engines comprising a driven member engageable with a part of the engine to be started, a driving member, a rotatable shaft rotatable relative to said driven and driving members, a control member mounted on said rotatable shaft for longitudinal movement thereof and rotary movement therewith, friction clutch means between said control member and said driving member, transmission means between said rotatable shaft and said driven member, said control member being axially displaceable on said rotatable shaft to render said clutch means fully operative only after engagement of the driven member with a part of the engine to be started, a manually operable member displaceable at will for bringing said driven member into engagement with a part of the engine to be started, and means carried by said manually operable member for operating said friction clutch means.

8. Starting mechanism for internal combustion engines comprising a driven member engageable with a part of the engine to be started, a driving member, a threaded sleeve rotatable relative to said driven and driving members, a control member mounted on said sleeve for longitudinal movement thereon and rotary movement therewith, friction clutch means between said control member and said driving member, transmission means between said sleeve and said driven member, said control member being axially displaceable on said sleeve to render said clutch means fully operative only after engagement of the driven member with a part of the engine to be started, a manually operable member extending through said sleeve and displaceable at will for moving said driven member into engagement with a part of the engine to be started, and means carried by said manually operable member for initially operating said clutch means.

HERMANN KLEIN.